United States Patent
Dierker et al.

(10) Patent No.: US 6,471,212 B1
(45) Date of Patent: *Oct. 29, 2002

(54) BRUSH SEAL

(75) Inventors: Olaf Dierker, Weinheim; Harald Römer, Waldshut-Tiengen; Heinrich Roth, Lauchringen, all of (DE)

(73) Assignee: Alstom, Paris (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/156,758

(22) Filed: Sep. 18, 1998

(30) Foreign Application Priority Data

Sep. 25, 1997 (EP) .............................. 97810707

(51) Int. Cl.⁷ ................................. F16J 15/44
(52) U.S. Cl. ...................................... 277/355
(58) Field of Search ................. 277/355, 421, 277/419, 418

(56) References Cited

U.S. PATENT DOCUMENTS

| 1,419,927 A | 6/1922 | Hodgkinson |
| 5,026,075 A | 6/1991 | Massarani |
| 5,066,025 A | 11/1991 | Hanrahan |
| 5,308,088 A | * 5/1994 | Atkinson et al. ........... 277/355 |
| 5,351,971 A | * 10/1994 | Short ......................... 277/355 |
| 5,799,952 A | * 9/1998 | Morrison et al. ........... 277/355 |
| 5,975,535 A | * 11/1999 | Gail et al. .................. 277/355 |

FOREIGN PATENT DOCUMENTS

| DE | 2931714 | 1/1981 |
| FR | 379.209 | 10/1907 |
| FR | 584.619 | 2/1925 |
| GB | 2066382 | 7/1981 |
| GB | 1598926 | 9/1981 |

* cited by examiner

Primary Examiner—Anthony Knight
Assistant Examiner—Enoch Peavey
(74) Attorney, Agent, or Firm—Burns, Doane, Swecker & Mathis, L.L.P.

(57) ABSTRACT

In a brush seal for sealing off the gap between a rotating and a stationary component, a plurality of radially inwardly running, elastically flexible brushes are held at one end in a basic body seated in a first of the components. They bear sealingly at the other end on the annular other component. The brushes bear, over their predominant longitudinal extent, on a guide plate. Both the basic body and the guide plate are seated in a groove of one of the components. The basic body and the guide plate are held in their mutual position by means of a wire mortised into the groove.

5 Claims, 1 Drawing Sheet

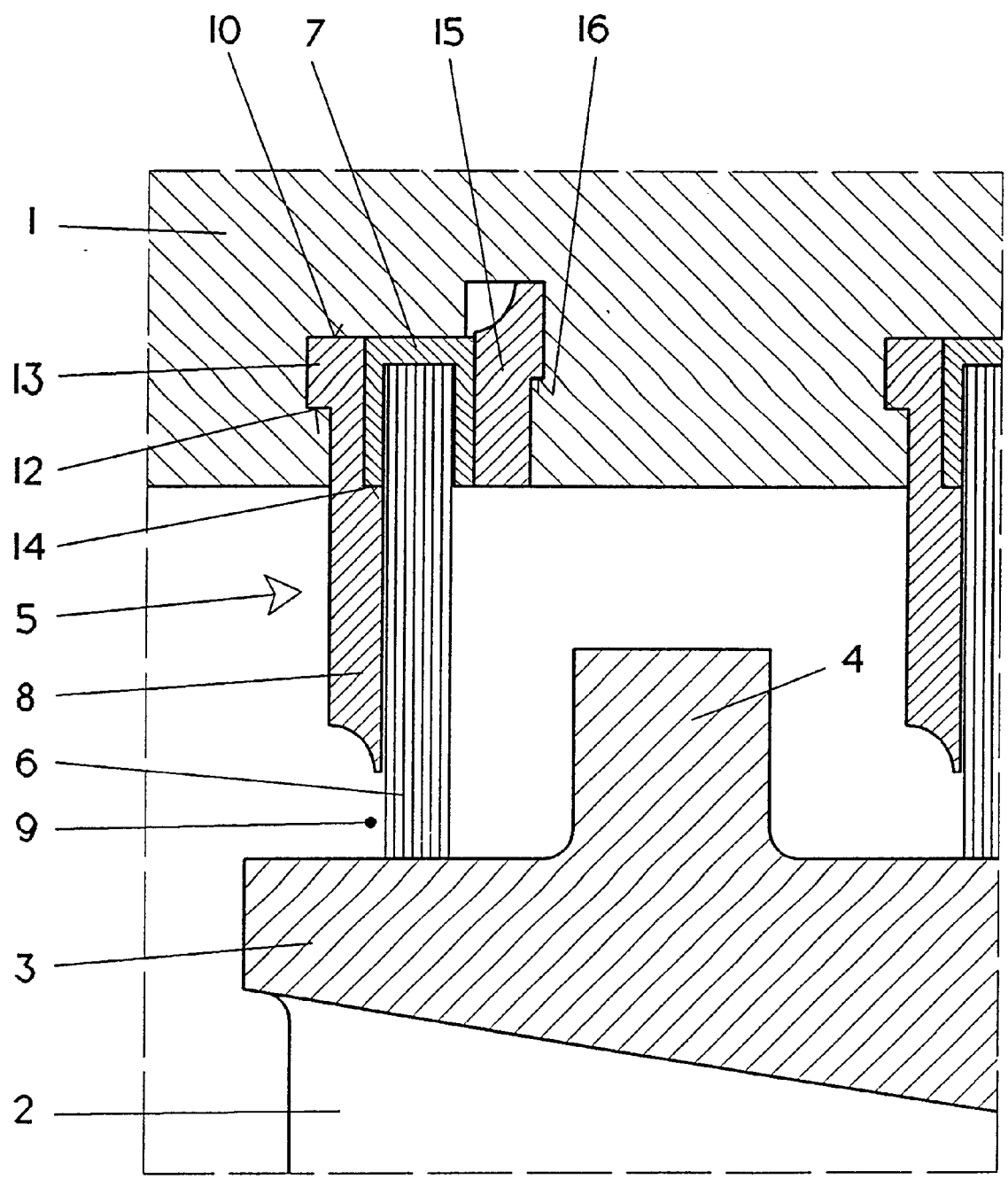

BRUSH SEAL

BACKGROUND OF THE INVENTION

1. Field of the Invention

The invention relates to a brush seal for sealing off the gap between a rotating and a stationary component, in which seal a plurality of radially inwardly running, elastically flexible brushes are held at one end in a basic body seated in a first of said components and bear sealingly at the other end on the annular other component, the brushes bearing, over their predominant longitudinal extent, on a guide plate, both the basic body and the guide plate being seated in a groove of one of the components.

2. Discussion of Background

A brush seal of th is type is known from GB-C 1,598,926. In this version, guide plates are provided o n both sides of the brushes, said guide plates at the same time forming the basic body in which the brushes are held. These brushes are fastened in the side plates by being welded at one of their ends to the side plates. In order to ensure that the brushes are moveable, one of the side plates is cut out for the purpose of forming an axial gap between plate and brush. This measure makes it possible to design the radial length of the two side plates so as to provide the least play permissible. One of the side plates is angled and serves for fastening the brush seal to the housing, fastening being carried out via rivets.

In another solution known from GB-A 2,066,382, the brushes are likewise welded at one of their ends to the side plates so as to form a solid block. The seal is held axially and radially in the housing by means of a ring having an external thread.

In these known embodiments, in so far as they are used in turbomachines, one of the side faces has the task of supporting the brush fibers counter to the force originating from the pressure on the high pressure side and of thereby keeping sealing losses lower. The higher the pressure on the high pressure side, the smaller the gap must be between the side wall and the opposite component, so that the brushes, that is to say the fibers forming them, do not spring back too far and thus result in too large a sealing gap. In such brush seals, it is not permissible to fall short of a play which is necessary due to the installation conditions or to the thermal and rotor-dynamic circumstances.

SUMMARY OF THE INVENTION

The object on which the invention is based, in a brush seal of the initially mentioned type, is to provide a simple and space-saving fastening.

This is achieved, according to the invention, by holding both the basic body and the guide plate in their mutual position by means of a wire mortised into the groove.

BRIEF DESCRIPTION OF THE DRAWING

A more complete appreciation of the invention and many of the attendant advantages thereof will be readily obtained as the same becomes better understood by reference to the following detailed description, when considered in connection with the accompanying drawing, wherein the single FIGURE shows a brush seal in axial section.

DESCRIPTION OF THE PREFERRED EMBODIMENT

Referring now to the drawing, in the single FIGURE the detail shown relates, in this particular example, to the cover plate seal of a high pressure steam turbine. 1 designates the blade carrier as a stationary component and 2 designates, as a rotating component, a moving blade which is provided at its blade end with a cover plate 3. The cover plate may have a plurality of teeth 4 which, for the purpose of forming swirl chambers, define as narrow a gap as possible relative to the housing. On both sides of the tooth 4, a plurality of brush seals 5 are provided in the cover plate bedding of the housing.

This brush seal consists essentially of a cluster of elastically flexible individual brushes 6 which are arranged next to and one behind the other and which bear sealingly at one of their ends on the annular cover plate 3. The brushes are illustrated as running radially inward in the drawing plane. In reality, however, the brushes advantageously run obliquely in a circumferential direction.

The brushes are held at their other end in a basic body 7 countersunk in the housing 1. It has already become known, in this regard, to bond the brushes adhesively to the basic body. It goes without saying that any suitable fastening technique may be used here, allowance having to be made for the thermal and mechanical loads. In the example illustrated, the basic body is a simple U-profile which may be rolled to diameter.

The brushes bear, on one side, on a guide plate 8 virtually over their entire length. The remaining gap 9, which is to be sealed off by the brushes, is given the minimum dimension necessary for the machine to operate.

The basic body 7 and the guide plate 8 are seated in a groove 10 of the housing. This groove has a cutout 12, in which the guide plate 8 is suspended by means of a corresponding shoulder 13. On the side facing the brushes, the guide plate has a cutout 14, on which the basic body 7 is supported with one of its legs.

According to the invention, both the basic body and the guide plate are now held in their mutual position by means of a ring 15 mortised into the groove 10. In the mortised state, on the one hand, the ring is flush with the wall of the cover plate bedding and, on the other hand, the ring part knocked into the groove is deformed at its upper end in such a way that said part engages into a further cutout 16 of the groove.

The new measure is particularly advantageous in the case of machines with a split housing, for example with a horizontal parting plane, since there is sufficient space here for applying the necessary mortising tools.

Of course, the invention is not restricted to the exemplary embodiment shown and described. The new measure may be employed just as well in conventional labyrinths. Furthermore, it is conceivable that the rotating component may also be provided with the brush seal.

Obviously, numerous modifications and variations of the present invention are possible in light of the above teachings. It is therefore to be understood that, within the scope of the appended claims, the invention may be practiced otherwise than specifically described herein.

What is claimed as new and desired to be secured by Letters Patent of the United States is:

1. A brush seal for sealing off a gap between a rotary member mounted for rotation about an axis and a stationary member surrounding the rotary member, the brush seal comprising:
   a circumferential groove in the stationary member, the groove having a first outer wall and a second outer wall, a basic body received in the groove in abutting relation with the first outer wall, a plurality of brushes secured in the basic body and extending radially inward, relative to the axis of rotation of the rotary member, a guide plate received in the groove on one side of the basic body, and a ring received in the groove on the opposite side of the basic body, the guide plate having an axial shoulder, the groove including a retainer surface for engaging the axial shoulder, and the ring positioned in the groove in engagement with second outer wall, the second outer wall being spaced from the rotating member and the ring abutting the basic body on one side and abutting the radial wall of the groove, the radial wall of the groove having a circumferential step, and the ring being retained in the groove between the second outer wall and the step.

2. The brush seal according to claim 1, wherein the ring is mortised into the groove.

3. The brush seal according to claim 1, wherein the brushes are secured in an opening in the basic body, and the guide plate and the ring are positioned outside of the opening of the basic body.

4. A brush seal for sealing off a gap between a rotary member mounted for rotation about an axis and a stationary member surrounding the rotary member, the brush seal comprising:
- a circumferential groove in the stationary member;
- a basic body received in the groove in abutting relation with a first outer wall;
- a plurality of brushes secured in the basic body and extending radially inward, relative to the axis of rotation of the rotary member;
- a guide plate received in the groove on one side of the basic body; and
- a ring received in the groove and abutting the basic body on one side of the ring and abutting a radial wall of the groove on an opposite side of the ring.

5. The brush seal according to claim 4, wherein the ring is retained in the groove between a second outer wall and a circumferential step.

* * * * *